United States Patent [19]

Button et al.

[11] Patent Number: 5,185,636
[45] Date of Patent: Feb. 9, 1993

[54] METHOD FOR DETECTING DEFECTS IN FIBERS

[75] Inventors: Leslie J. Button, Big Flats, N.Y.; Jerald B. Dotson, Los Angeles, Calif.; Bruce W. Reding, Elmira; Christopher W. Wightman, Corning, both of N.Y.

[73] Assignee: Corning Incorporated, Corning, N.Y.

[21] Appl. No.: 816,883

[22] Filed: Dec. 31, 1991

[51] Int. Cl.$^5$ .................... G01N 21/88; G01N 21/89
[52] U.S. Cl. .................................... 356/73.1; 356/239
[58] Field of Search ............................... 356/73.1, 239

[56] References Cited

U.S. PATENT DOCUMENTS

| 3,982,816 | 9/1976 | Watkins | 356/73.1 |
| 4,046,536 | 9/1977 | Smithgall | 356/73.1 |
| 4,067,651 | 1/1978 | Watkins | 356/73.1 |
| 4,136,961 | 1/1979 | Young | 356/239 |
| 4,501,492 | 2/1985 | Douklias | 356/73.1 |
| 4,541,856 | 9/1985 | Maillard | 65/29 |
| 4,924,087 | 5/1990 | Bailey et al. | 356/73.1 |

OTHER PUBLICATIONS

"Measurement of Optical Fiber Diameter Using the Fast Fourier Transform", Mustafa A.G. Abushagur and Nicholas George, Applied Optics, Jun. 15, 1980, vol. 19, No. 12, pp. 2031–2033.

Primary Examiner—Vincent P. McGraw
Attorney, Agent, or Firm—K. McNeill Taylor, Jr.

[57] ABSTRACT

Methods for deteting defects, such as, holes or voids, in optical waveguide fibers are provided. The methods employ far-field interference patterns produced by transversely illuminating the fiber with a laser beam. Holes in the fiber produce a characteristic peak in the spatial frequency spectrum of the interference pattern which subdivides into two peaks which migrate in opposite directions as a hole grows in size. Holes also produce a characteristic increase in the total power of the interference pattern, the amount of the increase being a linear function of the size of the hole for holes having a diameter less than about 60% of the diameter of the fiber. The hole detection methods are incorporated in an overall system for controlling the drawing of optical waveguide fibers.

26 Claims, 11 Drawing Sheets

FRINGE PATTERN

METHOD FOR DETECTING DEFECTS IN FIBERS

FIELD OF THE INVENTION

This invention relates to methods and apparatus for detecting defects, e.g., holes or voids, in optical waveguide fibers.

BACKGROUND OF THE INVENTION

The ability to detect defects, such as holes or voids, e.g., airlines, in optical waveguide fibers is of central importance in providing high quality fibers and in devising manufacturing techniques which minimize the occurrence of such defects. Holes or voids typically occur at the center of a fiber (on-center holes), although they can be located anywhere in the fiber cross-section (off-center holes).

In the past, holes have been detected during the drawing of fibers as part of the procedures used to measure fiber diameter. Specifically, fiber diameter has been determined using the optical technique described in U.S. Pat. Nos. 3,982,816 and 4,067,651 to Lawrence Watkins. The basic components of the Watkins system are schematically illustrated in FIG. 1.

As shown therein, optical waveguide fiber 13, whose cross-section has been greatly expanded for purposes of illustration, is transversely illuminated by light 15 of sufficient spatial coherence and monochromaticity to create a discernible interference pattern in the far field, that interference pattern being created by the superposition of light reflected from the fiber surface 17 and light refracted through the fiber body 13. In practice, a laser, e.g., a HeNe laser, is the preferred light source because of its wavelength stability. The following discussion is thus in terms of a laser light source, it being understood that other light sources having sufficient spatial coherence and monochromaticity can be used if desired.

As explained in the Watkins patents, in the far field, this reflected and refracted light interferes to form fringe pattern 19. For an optical waveguide fiber having a core and a cladding, the fringe pattern will in general be a function of the wavelength of the incident light and of the indices of refraction and the diameters of both the core and the cladding. However, as shown by Watkins, if the core/clad ratio is not too large and if the fringe pattern is examined at sufficiently large angles, e.g., above about ±50° in FIG. 1 for core/clad ratios of less than about 0.5, the pattern will depend almost exclusively on the diameter and index of refraction of the cladding.

Accordingly, if the index of refraction (n) of the cladding is known, the outside diameter (d) of the fiber can be determined by analyzing the fringe pattern. Specifically, the diameter can be approximated with good precision by counting the number of full and partial fringes (N) between two angles ($\theta_a$ and $\theta_b$) and then using the following equations to calculate d:

$$E(\theta_a) = \sin(\theta_a/2) + [n^2 + 1 - 2n \cos(\theta_a/2)]^{\frac{1}{2}} \quad (1)$$

$$E(\theta_b) = \sin(\theta_b/2) + [n^2 + 1 - 2n \cos(\theta_b/2)]^{\frac{1}{2}} \quad (2)$$

$$d = N\lambda/[E(\theta_b) - E(\theta_a)] \quad (3)$$

where $\lambda$ is the wavelength of the laser light used to illuminate the fiber. Note that in equation 3, there is a direct relationship between diameter and fringe count. In practice, given an invariant clad index and an invariant wavelength, one can calibrate the system with an empirical constant which, when multiplied by the number of fringes, gives the diameter.

A typical fringe pattern in the range from +50° to +70° for a 125 micron single mode fiber is shown in FIG. 3(a). Approximately 62 fringes appear in this 20° range, which is as predicted by the Watkins model.

The effect of a 20 micron, on-center hole on the pattern of FIG. 3(a) is shown in FIG. 3(b). As can be seen in this figure, the presence of the hole results in missing (fewer) fringes. In the past, the change in fringe pattern between FIGS. 3(a) and 3(b) has been used during the fiber drawing process to detect holes.

Specifically, when a fiber is being drawn at or near its target diameter, the location of each fringe in the interference pattern is predictable. Using this fact, holes have been detected by watching for a missing sequence of fringes of a prescribed, user-settable length, e.g., two missing fringes in a row.

Although this technique has worked reasonably well in practice, it has suffered from a number of problems.

First, small holes result in the loss of only a few fringes and thus can be easily missed. Accordingly, fiber may be considered acceptable when in fact it contains holes. Also, holes tend to start small, grow larger, and then diminish in size. The inability to detect small holes means that the beginning and end of a hole's life cycle cannot be seen. Accordingly, long lengths of fiber on either side of the portion of a fiber where a hole is detected must be discarded to insure that the entire hole is removed.

Second, although the hole detector may miss a small hole, the reduced number of fringes produced by such a hole will be detected by the overall control system and interpreted as a reduction in the fiber's diameter. The response will generally be to inappropriately increase the fiber's diameter. Accordingly, not only might fiber be sold with small holes, but the diameter of the fiber may also be off nominal.

Third, even if a hole does grow large enough to be detected, thus alleviating the concern of sending unacceptable product to a customer, the resultant diameter mismeasure is s gross that the control system is significantly disturbed and takes a substantial amount of time to restabilize.

Techniques for detecting defects in fibers and/or for dealing with the effects of defects on fiber diameter measurements can be found in Smithgall, Sr. U.S. Pat. No. 4,046,536 (analysis of fringe counts in the presence of "dropouts" resulting from faults in the fiber); Bailey et al. U.S. Pat. No. 4,924,087 (detection of fiber defects using light scattered out of the plane of the basic diffraction pattern); Douklias U.S. Pat. No. 4,501,492 (detection of fiber defects and testing of fiber diameters using a spatial filter prepared using diffracted/scattered light from a defect-free fiber); Maillard et al. U.S. Pat. No. 4,541,856 (use of "diffused" light to detect bubbles, blisters, and solid particles in a stream of molten glass); and Young, II U.S. Pat. No. 4,136,961 (detection of defects in glass blanks by rotating the blank through a thin beam of light).

The use of fast Fourier transforms (FFTs) to analyze fringe patterns in order to determine fiber diameters is discussed in an article by Mustafa Abushagur and Nicholas George entitled "Measurement of Optical Fiber Diameter Using the Fast Fourier Transform," *Applied Optics*, Jun. 15, 1980, vol. 19, no. 12, 2031-2033. The article contains no disclosure or suggestion of the use of fast Fourier transforms to detect defects in fibers.

SUMMARY OF THE INVENTION

In view of the foregoing state of the art, it is an object of this invention to provide improved methods and apparatus for detecting defects in optical waveguide fibers or, more generally, any transparent filament.

More particularly, it is an object of the invention to provide improved defect detection techniques which can 1) detect small defects, 2) follow the life cycle of defects, and 3) characterize whether a defect is on or off center.

It is also a object of the invention to provide defect detection techniques based on parameters different from those used to measure fiber diameter so that the steps of diameter control and defect detection can be uncoupled in the overall control system, i.e., to avoid the problems in the prior art where the same parameter (missing fringes) was used to perform both functions.

To achieve the foregoing and other objects, the invention provides two techniques for detecting defects in optical waveguide fibers which can be used separately or, preferably, in combination. Both techniques are based on effects on the far-field interference pattern produced by holes and are applicable to holes ranging in size from about 1% of the fiber's diameter up to about 60% of the fiber's diameter. Each technique involves detecting a portion of the far-field interference pattern, e.g., the portion lying between, for example, 50 and 70 degrees, and then analyzing the detected pattern to determine if a hole is present.

In particular, the first technique involves generating a spatial frequency spectrum for the detected pattern. In certain preferred embodiments of the invention, the spectrum is generated using a fast Fourier transform.

As discussed in the Abushagur and George reference, supra, the spatial frequency spectrum will contain a line (component) corresponding to the outer diameter of the fiber (hereinafter referred to as the "O.D. line", the "O.D. component", the "first line", or the "first component").

In accordance with the invention, it has been found that, when the fiber contains a defect, the spectrum will contain a second component whose frequency (or frequencies when split (see below)) is greater than that of the D.C. component and less than the frequency of the O.D. component. In particular, for small, centered holes, the frequency of the second component is approximately half the frequency of the O.D. component.

Moreover, it has been further found that as a small, centered hole grows in size, the second component splits into two subcomponents which migrate in opposite directions from the original location of the second component, i.e., one subcomponent moves up in spatial frequency towards the O.D. line as the hole increases in size, while the other subcomponent moves down in spatial frequency towards the DC line.

Accordingly, by detecting this second component and by observing its behavior over time, both small holes and the growth of a hole over time can be monitored.

The second technique involves determining the total power of the detected interference pattern. In accordance with the invention, it has been found that the total power increases essentially linearly with hole size. Accordingly, by monitoring total power over time, one can monitor the creation and growth of holes in the fiber. Pure hole detection can be accomplished by setting a threshold for the total power which when exceeded indicates the presence of a hole. The threshold can be set, for example, empirically by measuring the total power for a defect-free fiber and then adding a selected amount of power to this base level to arrive at the threshold.

In addition to being affected by the presence of holes, the total power is also directly proportional to the power of the light incident on the fiber. Therefore, monitoring total power can be subject to errors due to fluctuations in the illumination system.

However, in accordance with the invention, it has been determined that the magnitude (spectral power) of the O.D. component is also directly proportional to the power of the light incident on the fiber and is essentially independent of the presence of a hole for holes smaller than about 60% of the fiber's diameter. Accordingly, by monitoring both the total power of the interference pattern and the power of the O.D. component, changes due to the presence of a hole can be distinguished from changes due to fluctuations in the illumination system. More specifically, by normalizing total power with the power of the O.D. component, one yields an indicator which is invariant to changes in source power, but which will increase in the presence of a hole of increasing size. Again, by monitoring this normalized power over time, one can monitor the creation and growth of holes in fiber, and by setting a threshold for the normalized power, pure hole detection can be achieved.

In certain embodiments of the invention, spatial frequency spectra are determined at more than one location, e.g., at $+61.5°$ and $-61.5°$ in FIG. 2, and second components are searched for and identified in each of the spectra. Differences in the frequency and/or shape and/or size of the second components are then used as an indication of whether the detected hole is on or off center.

Combinations of the above techniques, e.g., second component detection plus total power monitoring plus multiple location detection, can be used to provide cross checks on the operation of the individual techniques.

Because incident light is refracted by the fiber, light from a single source cannot reach all portions of the fiber's cross-section see FIG. 13). (Note that this effect also occurs in the prior art technique discussed above.) The embodiments of the invention which use multiple light sources incident on the fiber at different angles can reduce or eliminate these blind spots, thus increasing the probability of detecting holes of arbitrary location.

The accompanying drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

As discussed above, the present invention relates to methods for detecting defects in transparent filaments. A particularly important application of the invention is in the area of control systems for drawing optical waveguide fibers. Such control systems include methods for measuring fiber diameters.

The preferred embodiments of the invention are therefore described below in terms of their integration with a diameter measurement system developed by the assignee of this application. That system is discussed in detail in U.S. patent application Ser. No. 07/816,491, entitled "Method for Measuring Diameters of Non-Circular Fibers," and U.S. patent application Ser. No. 07/816,882, entitled "Measurement of Fiber Diameters with High Precision," both of which applications are being filed concurrently herewith and are commonly assigned with this application. The relevant portions of these applications are hereby incorporated herein by reference. It is to be understood, of course, that the present invention can be used in environments other than process control systems and that the description of the invention in connection with such a system is only for the purpose of illustration.

Figure 1:
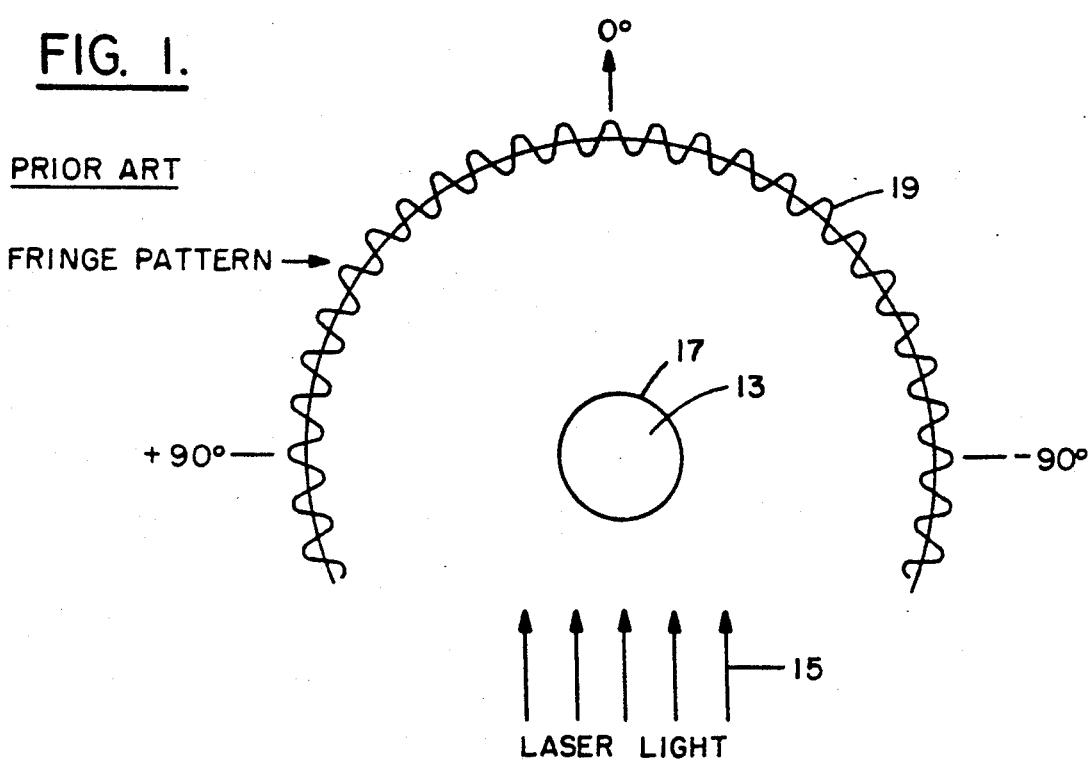
FIG. 1 is a schematic illustrating the basic elements of a Watkins-type system for measuring fiber diameters using far-field interference patterns.
Figure 2:
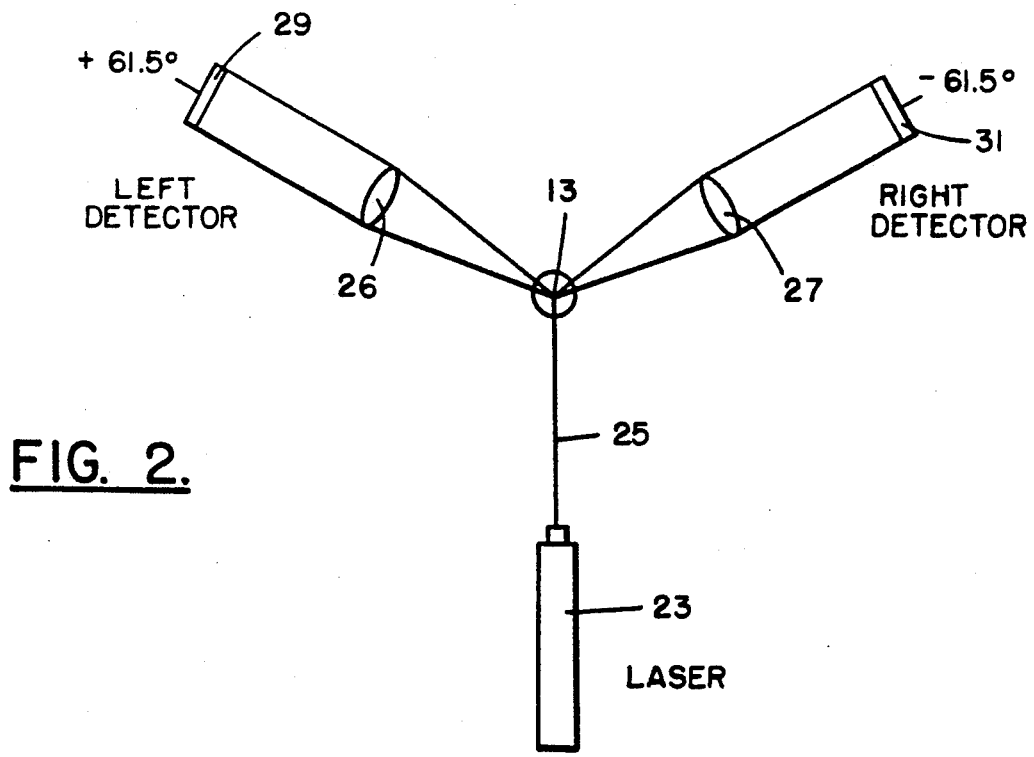
FIG. 2 is a schematic diagram illustrating the components of a fiber diameter measurement system with which the present invention can be used.
Figure 3A:
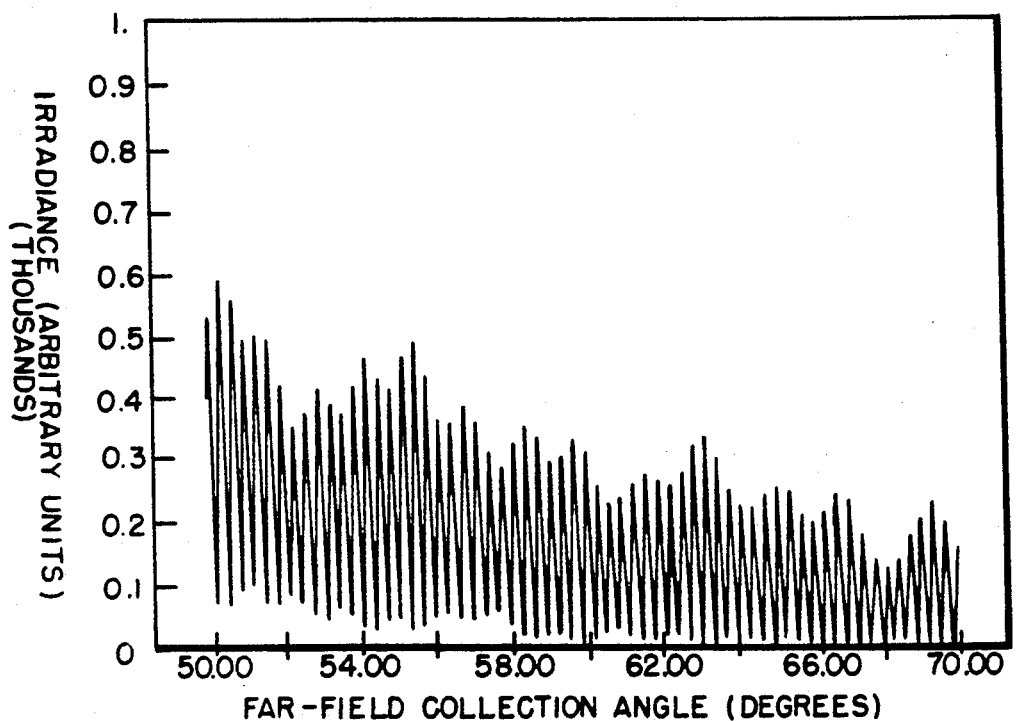
FIG. 3(a) shows a typical far-field interference pattern of a 125 micron, coreless fiber for the angular range between 50 and 70 degrees.
Figure 3B:
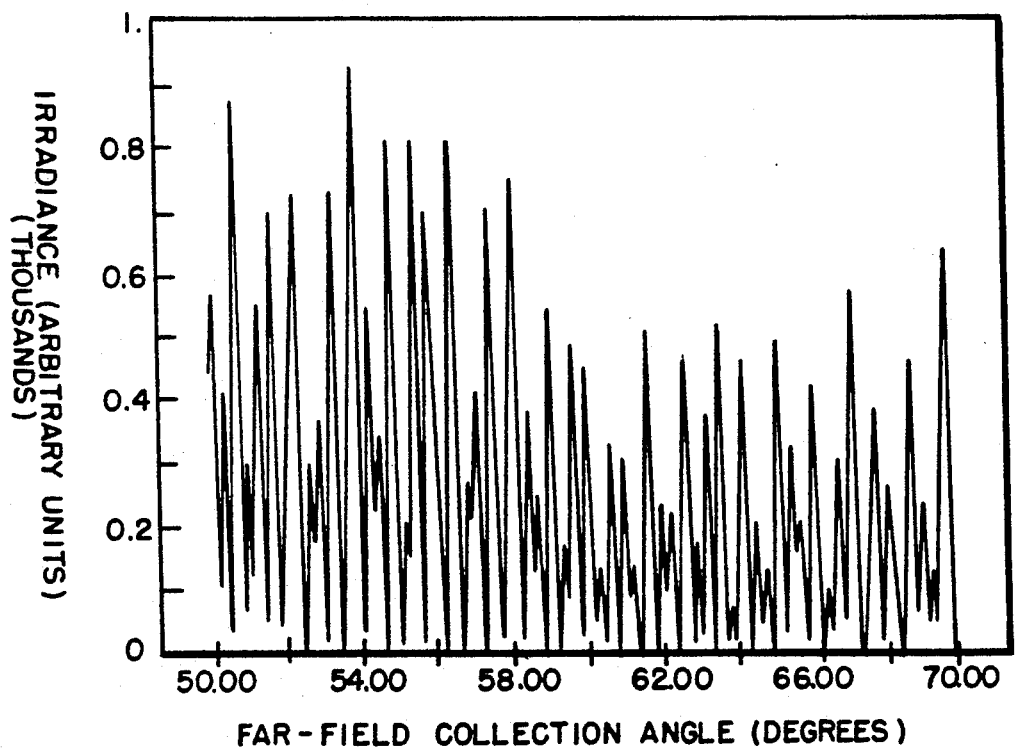
FIG. 3(b) shows the effect of a 20 micron, on-center hole on the fringe pattern of FIG. 3(a).

FIG. 2 shows a system for measuring fiber diameter constructed in accordance with the aforementioned application entitled "Method for Measuring Diameters of Non-Circular Fibers." The system includes laser 23 which produces a beam 25 of collimated, coherent, monochromatic light. Light from beam 25 is reflected and refracted by fiber 13 so as to produce a far-field interference pattern according to equations 1-3. Optical systems 26,27 project the far-field interference pattern onto left and right detectors 29,31. The detectors can comprise linear arrays of photodetectors whose output, after analog to digital conversion, consists of a digital representation of the fringe pattern. A discussion of optical systems 26,27 and their relationship to detectors 29,31 can be found in the above referenced application entitled "Measurement of Fiber Diameters with High Precision," the relevant portions of which are incorporated herein by reference.

As shown in FIG. 2, the center of detector 29 lies at $+61.5°$ and the center of detector 31 lies at $-61.5°$. The derivation of these values is discussed in detail in the above referenced copending application entitled "Method for Measuring Diameters of Non-Circular Fibers." A suitable angular extent for each detector is 20°, i.e., from $+51.5°$ to $+71.5°$ for detector 29 and from $-51.5°$ to $-71.5°$ for detector 31. Detectors having other angular extents can, of course, be used if desired. For example, in practice, a detector having an angular extent of 16° has been found to work successfully.

The output of each detector is analyzed separately to generate a signal representative of the diameter of the fiber. In accordance with the above referenced copending application, the two signals are averaged to produce a final signal which is representative of the fiber diameter and which is substantially insensitive to fiber ellipticity.

The analysis of the output of each of the detectors is preferably performed in accordance with the procedures of the aforementioned application entitled "Measurement of Fiber Diameters with High Precision." As described in that application, a fast Fourier transform (FFT) is applied to the digital output from the detector and the spectrum produced by that transform is used to obtain a coarse estimate for the frequency of the spectrum's O.D. line. The desired diameter of the fiber is determined with a precision of at least 0.02 microns by performing discrete Fourier transforms for a fine grid of frequencies centered on the coarse estimate for the O.D. line obtained by the FFT.

In accordance with certain of its aspects, the defect detection technique of the present invention uses the FFT spectrum generated by the above referenced fiber diameter measurement technique. In particular, as discussed above, it has been found that defects produce a second component in the FFT spectrum at a spatial frequency smaller than that of the O.D. line, but greater than the D.C. component.

Figure 4:
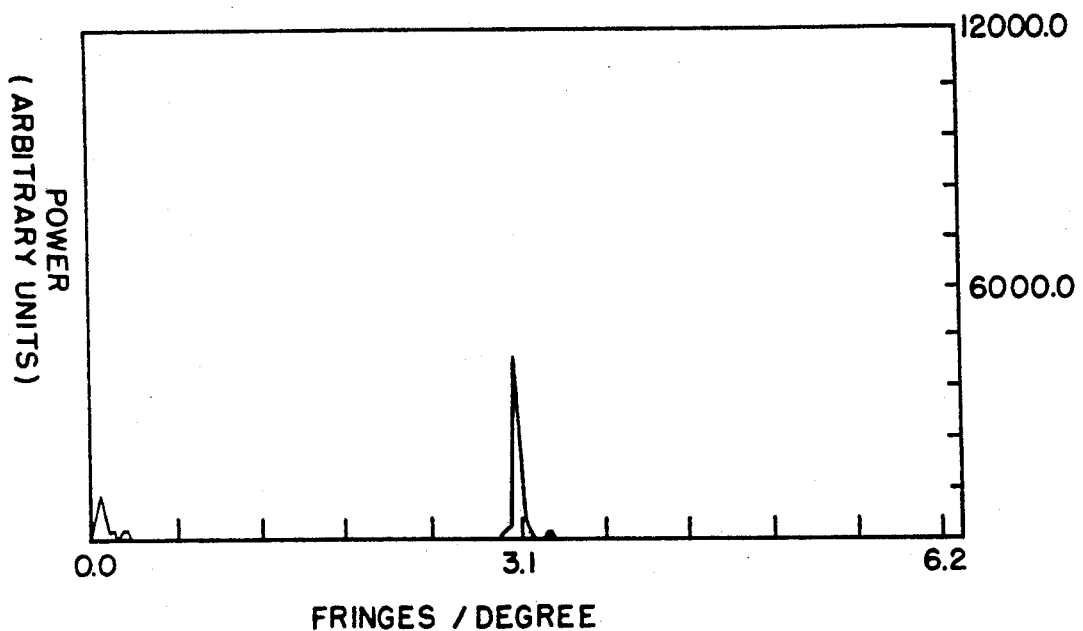
FIG. 4 shows the frequency spectrum of the fringe pattern of FIG. 3(a).
Figure 6A:
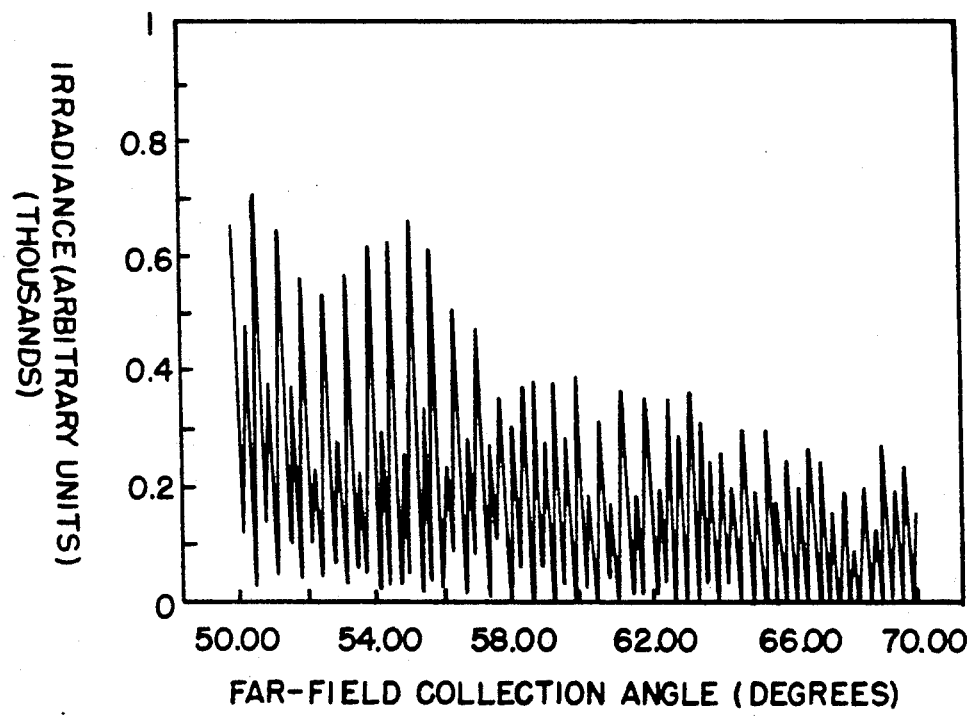
FIG. 6(a) shows a typical far-field interference pattern of a 125 micron, coreless fiber containing a 2 micron on-center hole for the angular rang between 50 and 70 degrees.
Figure 6B:
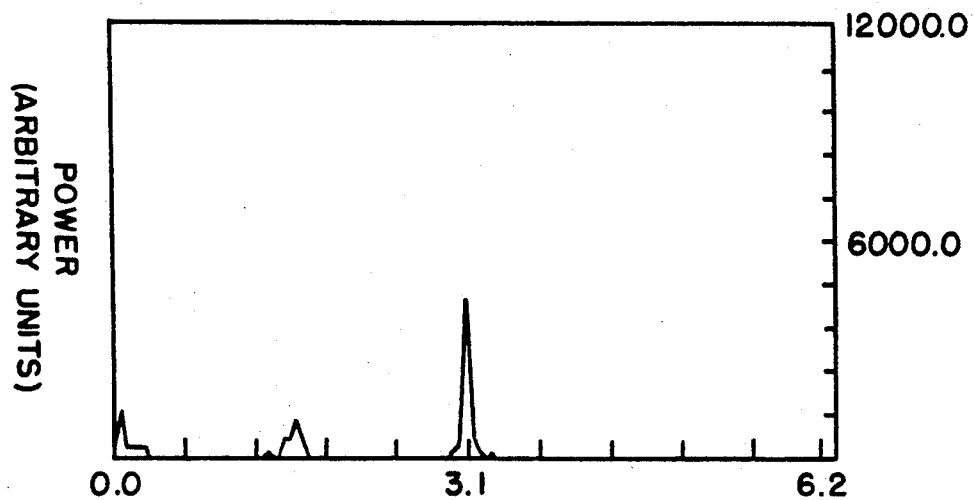
FIG. 6(b) shows the frequency spectrum of the fringe pattern of FIG. 6(a).

The appearance of the second component can be seen by comparing the spectrum of a defect-free fiber (FIG. 4) with that of the same fiber with a 2 micron, on-center hole (FIG. 6(b)). As can be seen from this comparison, the defect causes a second peak to appear in the spectrum at a frequency of about half that of the O.D. peak, i.e., at about 1.55 cycles/degree for the parameters used to construct the plots of FIGS. 4 and 6(b). The techniques used to prepare these plots are discussed in detail below. Briefly, solutions for the far-field pattern were obtained by solving the scalar wave equation. (Note that a defect free fiber will have small amounts of power at some frequencies lower than the O.D. peak due to, for example, multiply reflected rays. However, the rays that form the second component of the present invention contain significantly more power. Therefore, the second component of the invention is easily distinguished from these background, low power peaks.)

Figure 5:
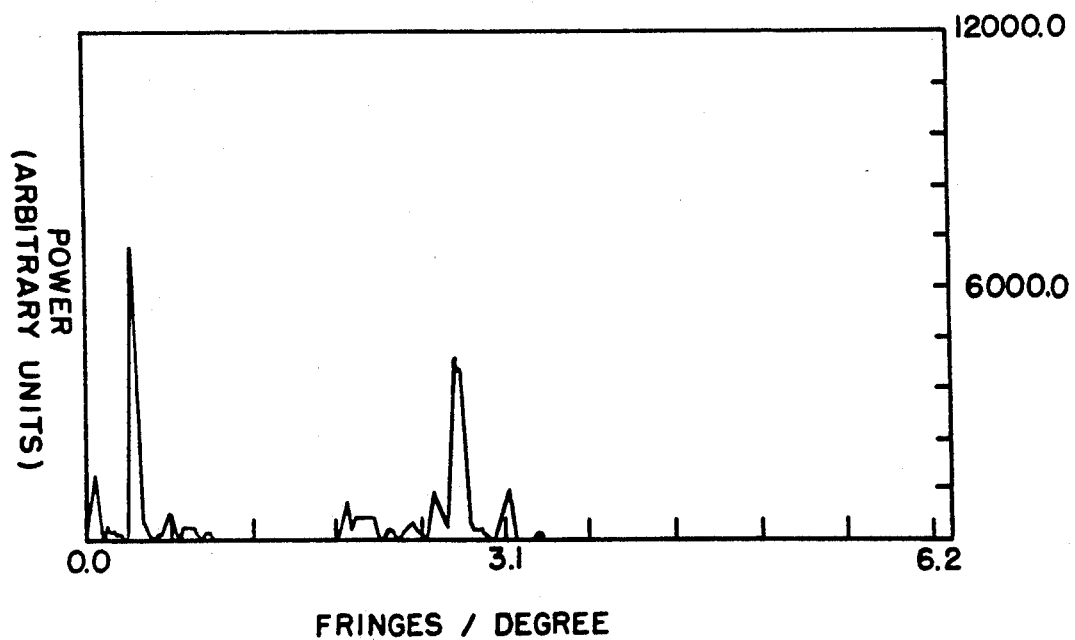
FIG. 5 shows the frequency spectrum of the far-field interference pattern between 50 and 70 degrees (not shown) of a 125 micron, coreless fiber containing an 80 micron on-center hole.
Figure 7A:
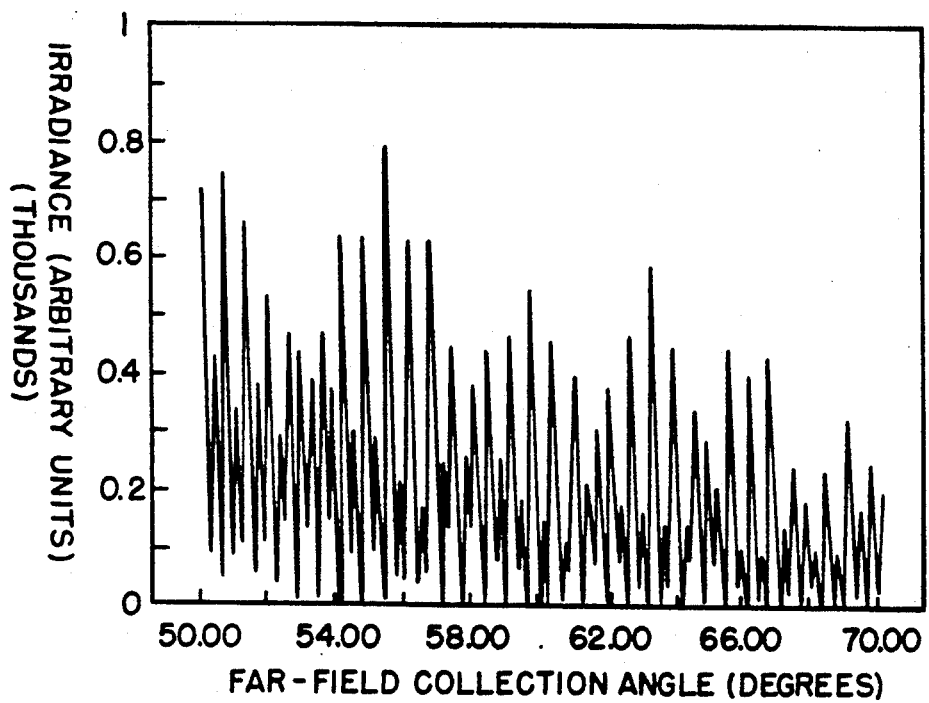
FIG. 7(a) shows a typical far-field interference pattern of a 125 micron, coreless fiber containing a 5 micron on-center hole for the angular range between 50 and 70 degrees.
Figure 7B:
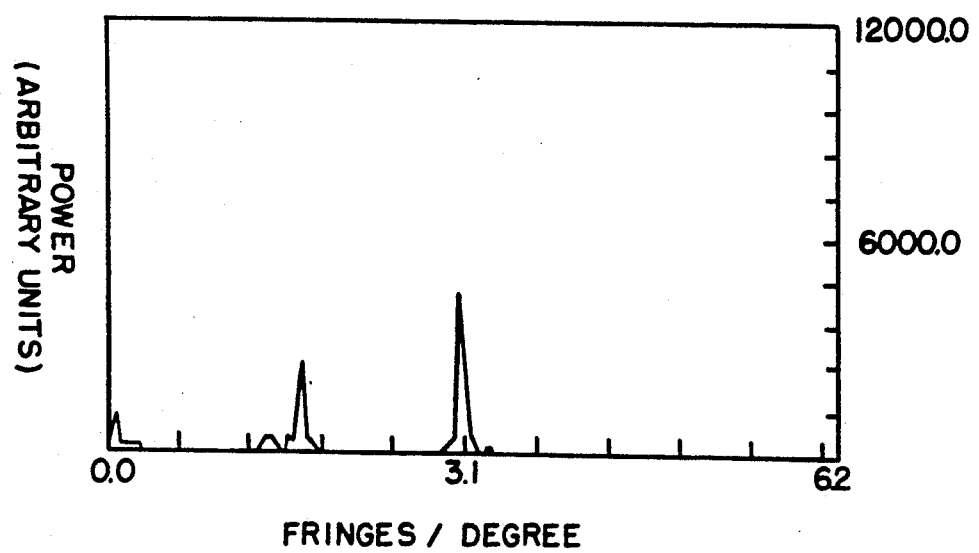
FIG. 7(b) shows the frequency spectrum of the fringe pattern of FIG. 7(a).

The behavior of the second component as the hole grows in size is shown in FIGS. 7(b)—5 micron hole, 8(b)—20 micron hole, and 9(b)—40 micron hole. As shown in these figures, as the hole size increases, the amplitude of the second component increases and that component splits into two subcomponents which move in equal and opposite directions from the original location of the second component.

Figure 12:
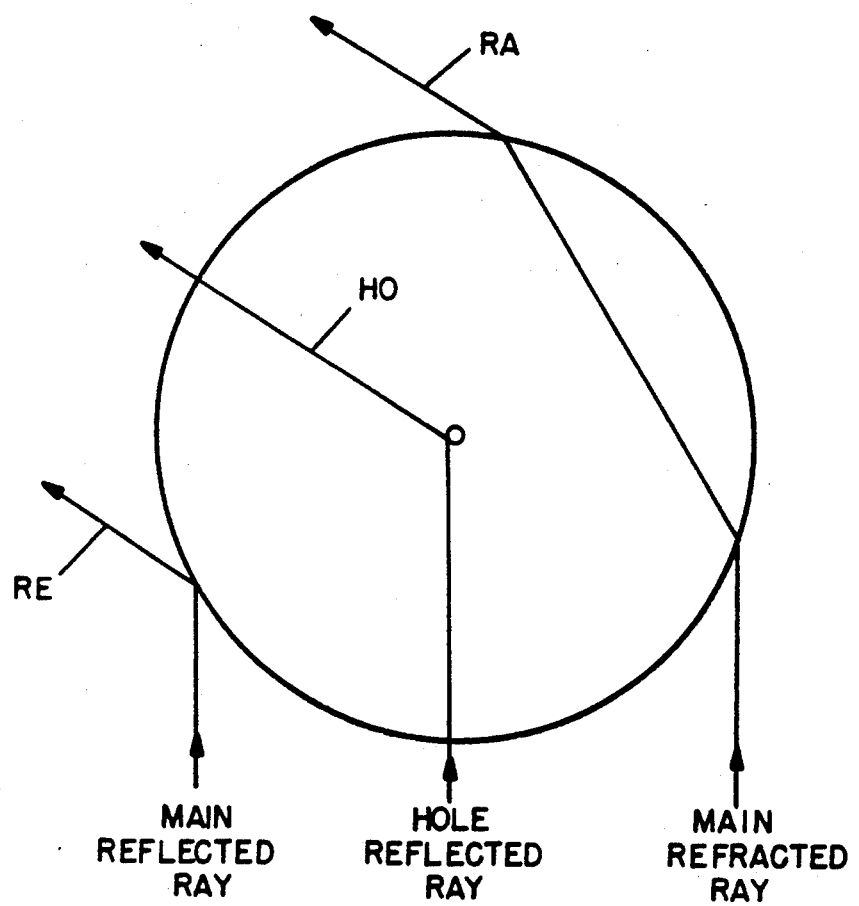
FIG. 12 is a schematic diagram showing reflected and refracted rays for a 125 micron, coreless fiber containing a 2 micron, on-center hole.

The origin of this behavior can be understood by considering a ray trace representation of scattering in the presence of a hole. FIG. 12 schematically shows the three types of rays which can interfere for a fiber containing a hole, i.e., a main reflected ray ("RE" ray) which undergoes only reflection at the outer surface of the fiber, a main refracted ray ("RA" ray) which undergoes refraction both upon entering and leaving the fiber, and a hole reflected ray ("HO" ray) which undergoes reflection at the hole (index equal 1.0) and refraction upon entering and leaving the fiber.

The HO ray (hole reflected ray) interferes with both the RE ray (main reflected ray) and the RA ray (main refracted ray). In general terms, the frequency of the far-field interference pattern is inversely related to the spacing between the scattering sources in the near field. Thus, the highest frequency component of the far-field pattern is due to the interference between the RE and RA rays and constitutes the O.D. component of the spectrum.

For small holes, the RE/HO and the RA/HO spacings are essentially equal and roughly half of the RE/RA spacing which products the O.D. peak. The equality of the spacing results in two superimposed peaks in the frequency spectrum of the far-field pattern (hence the appearance of a single valued second component for small holes as seen in FIG. 6(b)). The fact that these spacings are half that of the RE/RA spacing accounts for the factor of two lower frequency in the far field.

Figure 8A:
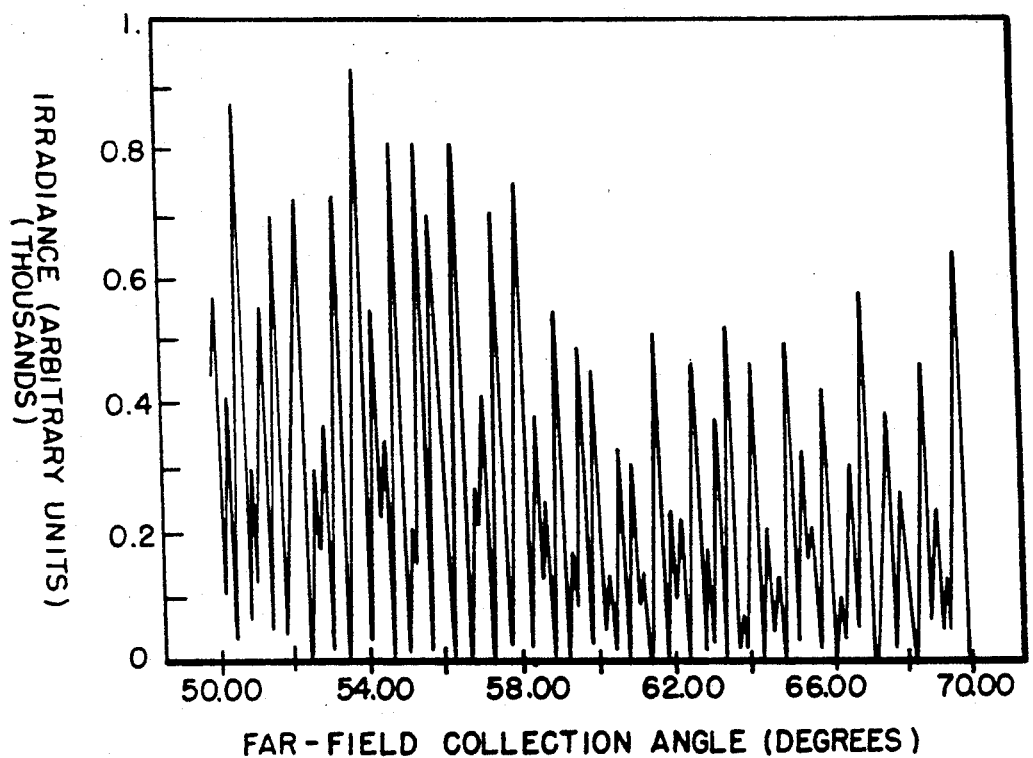
FIG. 8(a) shows a typical far-field interference pattern of a 125 micron, coreless fiber containing a 20 micron on-center hole for the angular range between 50 and 70 degrees.
Figure 8B:
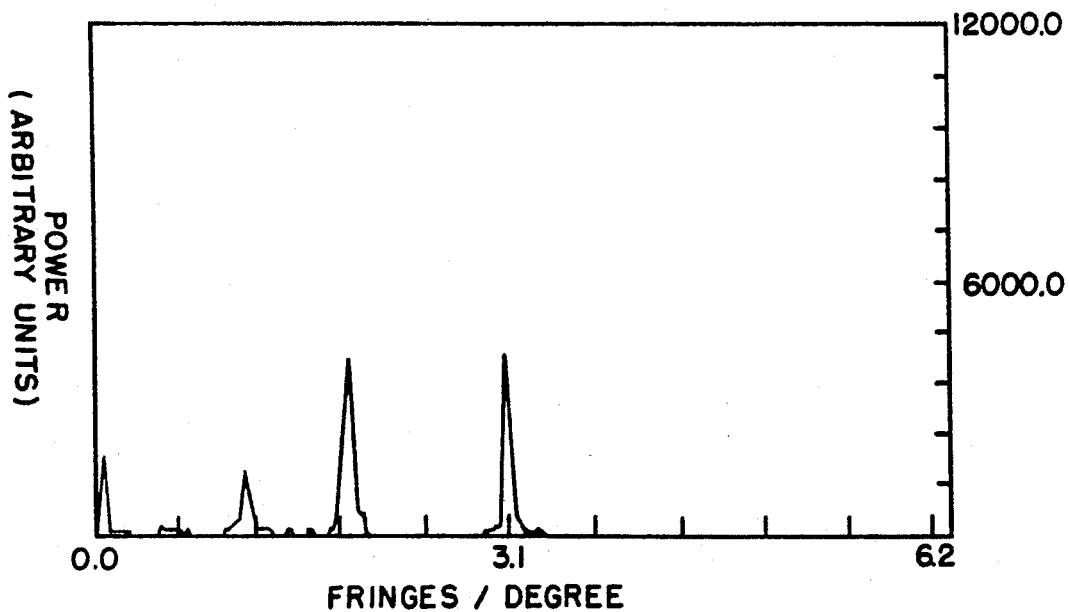
FIG. 8(b) shows the frequency spectrum of the fringe pattern of FIG. 8(a).

As the hole grows and its surface moves away from the centerline of the fiber, the HO/RE interference moves to lower frequencies, while the HO/RA interference moves to higher frequencies. Accordingly, a split peak is seen in the spatial frequency spectra (see FIGS. 7(b), 8(b), and 9(b)).

Figure 9A:
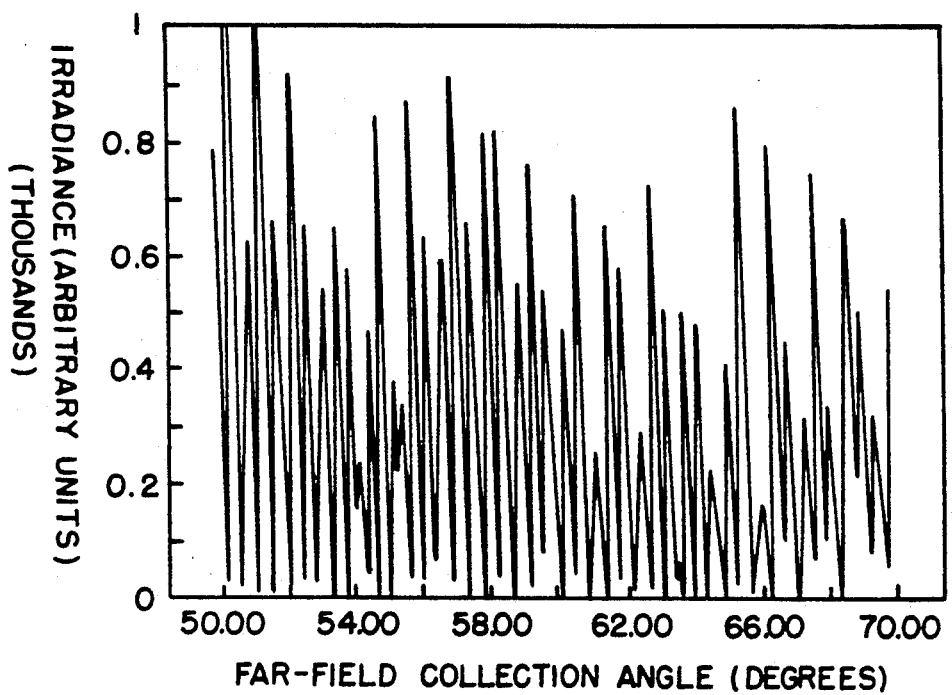
FIG. 9(a) shows a typical far-field interference pattern of a 125 micron, coreless fiber containing a 40 micron on-center hole for the angular range between 50 and 70 degrees.
Figure 9B:
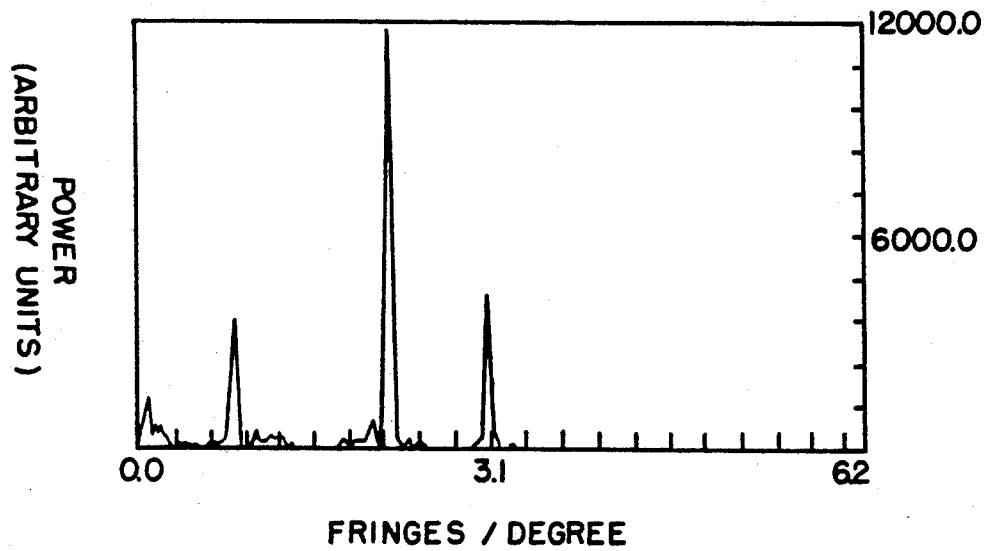
FIG. 9(b) shows the frequency spectrum of the fringe pattern of FIG. 9(a).

It should be noted that other rays pass through the fiber and can interfere producing other smaller peaks in the frequency domain as shown, for example, in FIG. 9(b). However, the HO, RE, and RA rays carry the majority of the power and thus dominate the frequency spectrum.

It is important to note that the frequency of the O.D. peak remains substantially unchanged in each of FIGS. 6(b) through 9(b). As discussed above, in accordance with the procedures of the aforementioned application entitled "Measurement of Fiber Diameters with High Precision," the location of the O.D. peak is used to determine and thus control the diameter of the fiber.

Thus, the constancy of the frequency of the O.D. peak is important because it means that fiber diameter measurement and control is uncoupled from hole detection, i.e., unlike the prior art, diameter measurement and control remains correct even in the presence of holes.

Sufficiently large holes will affect the O.D. peak. This effect is illustrated in FIG. 5 for an 80 micron hole in a 125 micron fiber. As can be seen in this figure, the O.D. component has been reduced in size and the higher frequency subcomponent of the second component is now directly adjacent to the O.D. peak.

Significant changes in the O.D. peak tend to start at a hole size equal to approximately six tenths of the fiber diameter, e.g., around 75 microns for a 125 micron fiber. Accordingly, since holes do not normally start out large, but rather start out small and then grow large, there is plenty of opportunity to detect a hole and make an appropriate adjustment to the fiber diameter control system before significant changes occur in the O.D. peak.

Note that the upper limit of hole size for which the O.D. peak remains unaffected can be increased slightly if the detector is moved to a large angle. This is because at these high angles, it is still possible for the main refracted ray to pass into and out of the fiber without hitting the hole. However, for a hole larger than approximately 0.67 of the fiber diameter, a refracted ray will not pass through the fiber without hitting the hole no matter how large an angle is detected in the far field.

Figure 10:
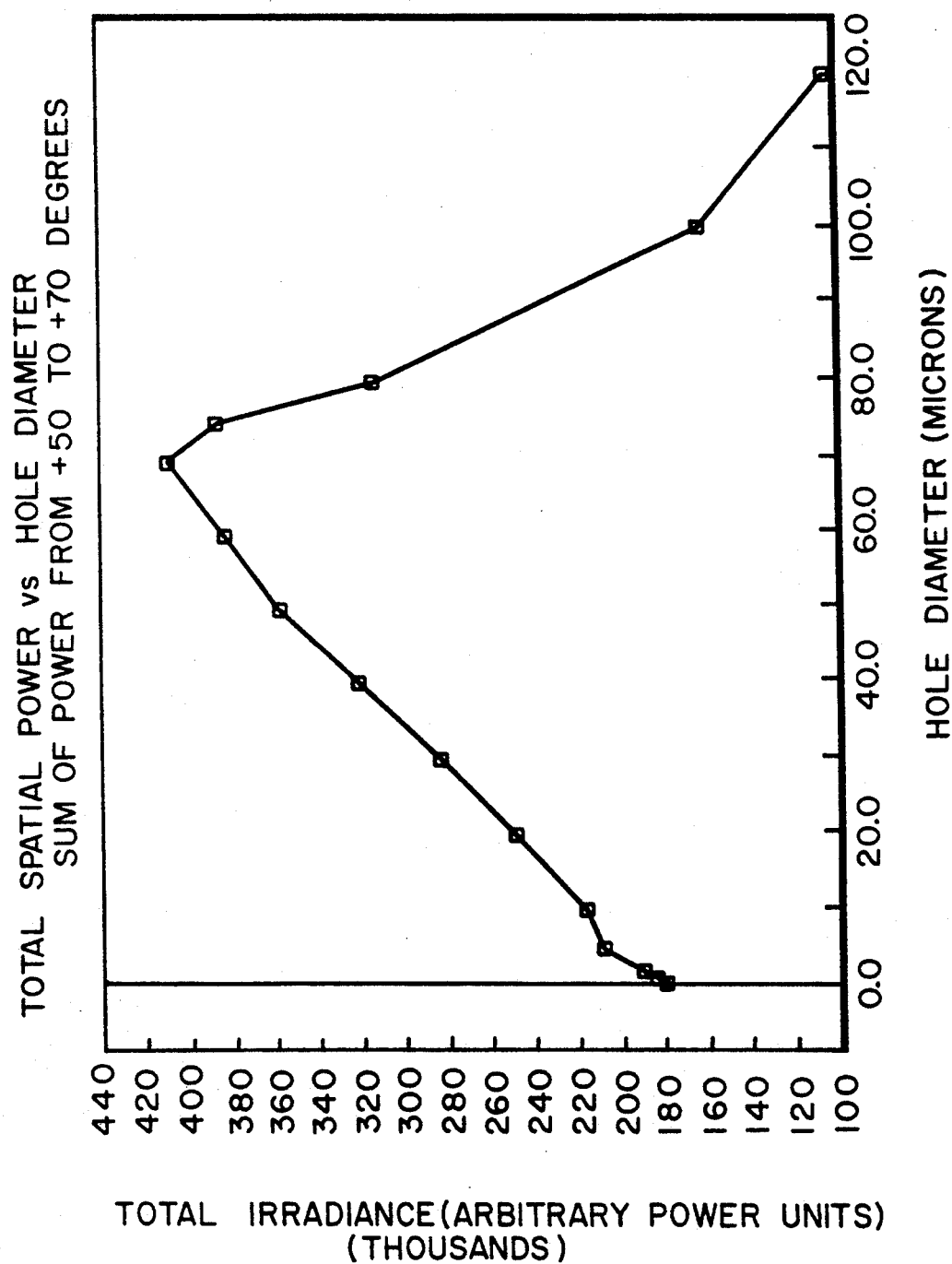
FIG. 10 is a plot of total power in the range from 50 to 70 degrees versus hole diameter for constant incident power.

Turning now to FIG. 10, this figure illustrates a second technique for detecting holes. As shown in this figure, the total power of the fringe patter increases essentially linearly with hole size for holes having diameters less than about 70 microns for a 125 micron fiber. The total spatial power plotted in this figure is the sum of the power over the range from 50 to 70 degrees, i.e., it is the integral of the fringe curves of FIGS. 3(a), 3(b), and 6(a) through 9(a). Note that the total spatial power can also be obtained by summing the magnitudes of the coefficients obtained from the fast Fourier transform.

Figure 11:
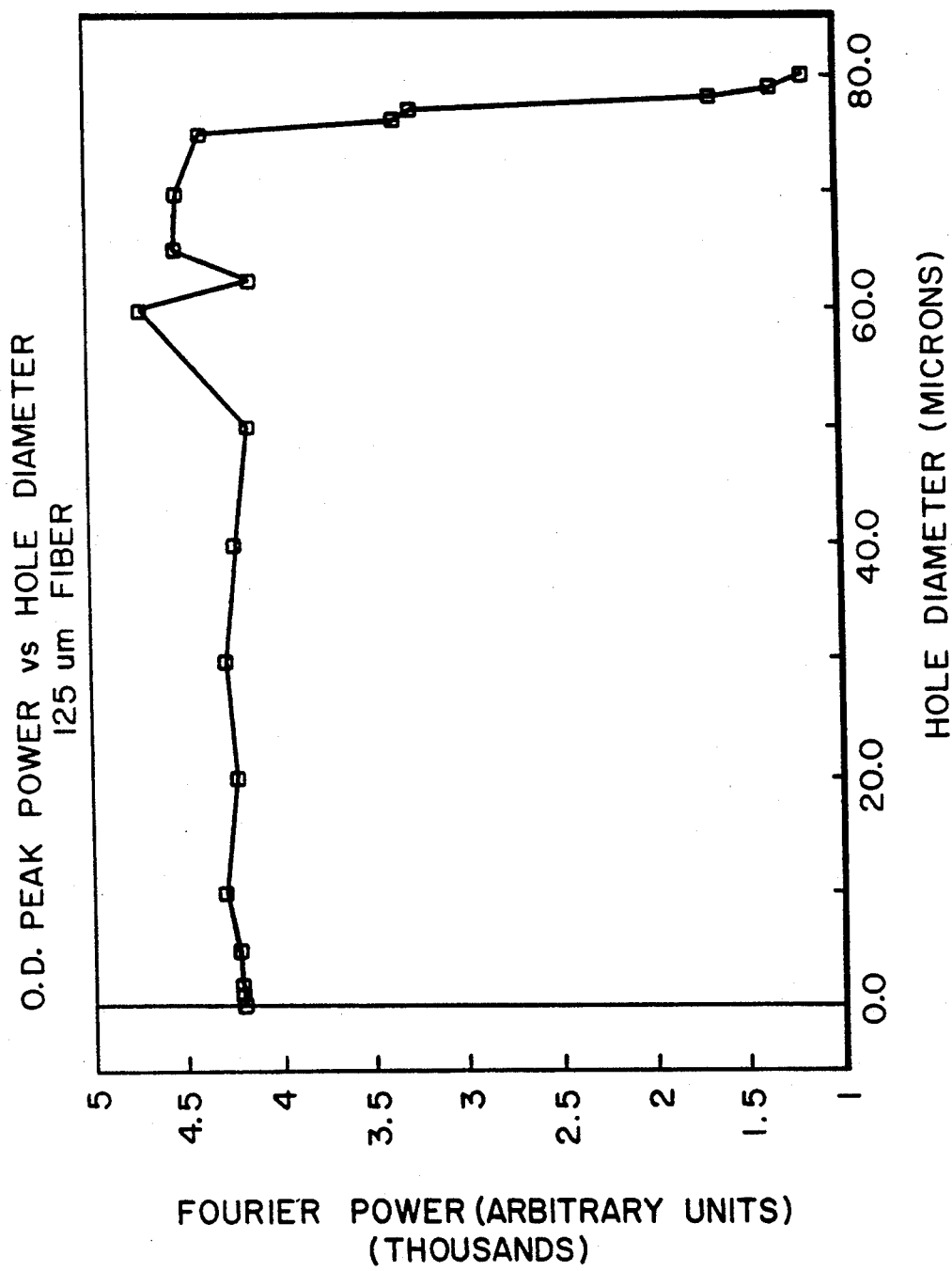
FIG. 11 is a plot of the power of the O.D. component versus hole diameter for constant incident power.

As discussed above, the effects of fluctuations in the illumination system on the measured total power can be distinguished from the effects of holes on that parameter by monitoring the power of the O.D. peak. The constancy of the size of this peak for holes ranging up to about 70 microns for a 125 micron fiber is shown in FIG. 11. The values plotted in this figure are the peak values for the O.D. lines in FIGS. 4, 5, and 6(b) through 9(b). Since a fluctuation in the illumination system will affect both the total power and the O.D. peak power, the presence of a hole can be readily determined by looking for a change in the total power which is not accompanied by a change in the O.D. peak. More generally, the total power can be normalized to the O.D. peak power, and holes can be found by looking for changes in the normalized total power. (Note that ambient light striking the detector needs to be minimized since such light can change the total power without changing the O.D. peak.)

As with identifying the second component of the fringe pattern's frequency spectrum, the technique of monitoring the fringe pattern's total power is applicable to holes having a diameter less than about 60% of the fiber's diameter. Since holes normally start out small and grow larger, the technique's operating range is generally large enough to identify essentially all holes which occur in optical waveguide fibers. This is especially so when the total power and the second component techniques are used simultaneously, as is preferred.

The spatial frequency spectra of FIGS. 4, 5, and 6(b) through 9(b) are for on-center holes. Similar, but not identical, spatial frequency spectra are produced by off-center holes. In particular, the location of the second component and its behavior as a hole grows will be different for different viewing angles for an off-center hole.

This fact can be used to distinguish between on-center and off-center holes. In particular, such a distinction can be made by detecting the interference pattern at two or more locations, computing a spatial frequency spectrum for each location, and then comparing the second components for the multiple locations. If the comparison reveals that the second components are the same and change over time in the same way, the hole is on-center. On the other hand, if the second components differ among the various views, then the hole is off-center.

FIG. 2 shows two possible locations for the two views, i.e., $+61.5°$ and $-61.5°$. A comparison of spectra for these two locations will generally reveal whether the hole is centered or not. A centered hole will create second components which have the same shape and size. Whereas, the second components for an off-center hole will have different configurations. However, there are two azimuthal locations for an off-center hole which lie on the detectors' plane of symmetry (the 0° plane), and thus the second components for an off-center hole at these azimuthal locations will be incorrectly interpreted as being on-center.

As explained in the above referenced copending application entitled "Method for Measuring Diameters of Non-Circular Fibers", the ellipticity of a fiber can be characterized by using multiple sets of the laser/detector combinations shown in FIG. 2. The sets are stacked on top of one another with their central axes offset from one another. For example, two sets can be used with their central axes shifted by 45°. For such configurations, the ambiguity resulting from the plane of symmetry can be readily eliminated by simply computing spectra for one or more of the detectors in the additional set(s). A comparison of the resulting three or more spatial frequency spectra will unambiguously reveal if a hole is on-center or off-center.

The use of multiple sets of the laser/detector combinations of FIG. 2 is also advantageous since it can reduce or eliminate the existence of "blind" spots in the fiber where holes cannot be detected with a single light source.

Figure 13:
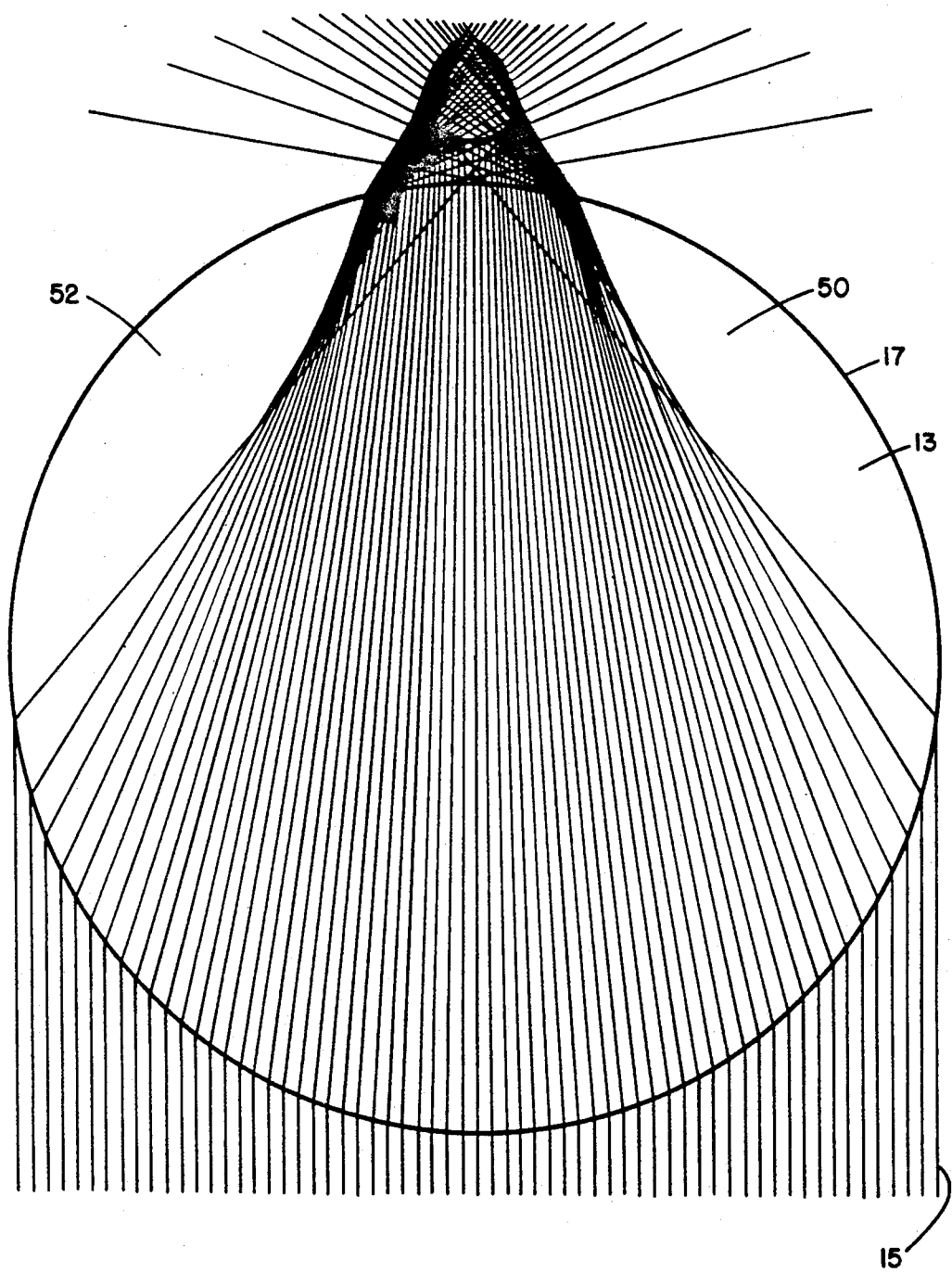
FIG. 13 is a schematic diagram showing the path of refracted rays through an optical waveguide fiber.

The origin of the blind spots is illustrated in FIG. 13. As shown therein, because the incident light 15 is refracted at surface 17 of fiber 13, light impinging on the fiber from a single direction cannot reach areas 50 and 52. For an index of refraction of 1.457 which was used to calculate FIG. 13, the combined area of the blind spots is around 16% of the total cross-sectional area of the fiber, and the angular extent of each area, measured from the center of the fiber, is about 80 degrees, i.e., the combined perimeter of the two areas is around 44% of the total perimeter of the fiber.

Because light cannot reach areas 50 and 52, it cannot reflect from holes located in those areas, and thus cannot generate a second component in the frequency spectrum or an increase in the total power. The use of multiple light sources, as in the case of multiple sets of the laser/detector combinations of FIG. 2, addresses this problem since the blind spots for the different sources will have different azimuthal locations, and thus, through an appropriate selection of the number and location of the sources, essentially all or, if desired, all areas of the fiber can receive light from at least one source.

The plots of FIGS. 3-11 are based on computed fringe patterns for a 125 micron, coreless fiber. The parameters used for the calculations were: $\theta_a = 50°$, $\theta_b = 70°$, $\lambda = 0.633$ microns, and $n = 1.457$. The spatial frequency spectra were obtained by performing a fast Fourier transform (FFT) on the calculated fringe data using the Cooley, Lewis, and Welch technique as described in their paper entitled "The Fast Fourier Transform and its Applications," IBM Research Paper RC 1743, Feb. 9, 1967, the relevant portions of which are incorporated herein by reference.

As known in the art, a fast Fourier transform operates by taking a set of M real data point values, e.g., the amplitudes of the far field interference pattern at M equally-spaced values of $\theta$, and converting those values into a set of M complex quantities (coefficients) at M equally-spaced spatial frequencies. The magnitudes of the M coefficients correspond to the spectral power at the different frequencies. The spacing between the frequencies ($\Delta f$) is equal to $1/M\Delta\theta$, where $\Delta\theta$ is the spacing between the original data points. The first M/2 coefficients and the second M/2 coefficients are related to one another in that they comprise mirror images of one another about the Nyquist frequency, where the Nyquist frequency is equal to one half the sampling frequency and the sampling frequency equals the number of samples divided by the angular extent of the detector.

If desired, techniques other than the fast Fourier transform can be used to generate spatial frequency spectra, e.g., discrete sequence Fourier transforms can be performed if desired. The FFT procedure, however, is preferred because of its high speed and because the frequencies of the first and second components do not have to be determined with high precision in the practice of the present invention (compare the above referenced patent application entitled "Measurement of Fiber Diameters with High Precision" where the frequency of the O.D. component does have to be determined with high precision and thus the FFT technique is unsuitable).

The process of the invention as described above is preferably practiced on a digital computer system configured by suitable programming to perform the various computation, identification, and comparison steps. The programming can be done in various programming languages known in the art. A preferred programming language is the C language which is particularly well-suited to performing scientific calculations. Other languages which can be used include FORTRAN, BASIC, PASCAL, C++, and the like.

The computer system can comprise a general purpose scientific computer and its associated peripherals, such as the computers and peripherals currently being manufactured by Digital Equipment Corporation, IBM, Hewlett-Packard, or the like. Alternatively, a dedicated system can be used in the practice of the invention, such as a system using multiple digital signal processing chips.

Preferably, the processing portion of the computer system should have the following characteristics: a processing rate of 50 million floating point operations per second; a word length of 32 bits floating point at least four megabytes of memory, and at least 40 megabytes of disk storage. The system should include means for inputting data from the photodetector array and means for outputting the results of the hole detection procedures both in electronic form for use in process control and in visual form for observation by system operators, maintenance personnel, and the like. The output can also be stored on a disk drive, tape drive, or the like for further analysis and/or subsequent display.

Although preferred and other embodiments of the invention have been described herein, other embodiments may be perceived by those skilled in the art without departing from the scope of the invention as defined by the following claims.

What is claimed is:

1. A method for detecting a defect in a transparent filament comprising the steps of:
   (a) directing a beam of radiation at a longitudinal position along the length of the filament so as to produce an interference pattern;
   (b) detecting said interference pattern at a first angular location;
   (c) generating a spatial frequency spectrum for said interference pattern detected at the first angular location;
   (d) identifying a first component of said spatial frequency spectrum of step (c), said first component corresponding to the outer diameter of the filament; and
   (e) identifying a second component of said spatial frequency spectrum of step (c), said second component having a spatial frequency greater than zero and less than the spatial frequency of the first component identified in step (d), the presence of the second component in the spatial frequency spectrum being indicative of the presence of the defect in the filament at the longitudinal position.

2. The method of claim 1 wherein the frequency of the second component is approximately half the frequency of the first component.

3. The method of claim 1 wherein the second component comprises two subcomponents at two different spatial frequencies both of which spatial frequencies are greater than zero and less than the spatial frequency of the first component.

4. The method of claim 1 including the additional steps of determining a value for the total power of the interference pattern detected at the first angular location and comparing said total power with a predetermined threshold.

5. The method of claim 1 including the additional steps of determining a value for the total power of the interference pattern detected at the first angular location, determining a value for the magnitude of the first component identified in step (d), normalizing the total power to the magnitude of the first component, and comparing the normalized total power with a predetermined threshold.

6. The method of claim 1 wherein:
   steps (b) through (e) are repeated for a sequence of longitudinal positions along the length of the filament; and
   the second component comprises two subcomponents at two different spatial frequencies for at least one of said longitudinal positions.

7. The method of claim 6 wherein the second component comprises two subcomponents at two different spatial frequencies for a plurality of said longitudinal positions and the difference in spatial frequency between the two subcomponents increases along the length of the filament.

8. The method of claim 6 wherein the second component comprises two subcomponents at two different spatial frequencies for a plurality of said longitudinal positions and the difference in spatial frequency between the two subcomponents increases and then decreases along the length of the filament.

9. The method of claim 6 including the additional steps of:
   (f) determining a value for the total power of the interference pattern detected at the first angular location for each of the sequence of longitudinal positions; and
   (g) identifying changes in the values for the total power determined in step (f) for the sequence of longitudinal positions, said changes in said values being indicative of the presence of the defect in the filament.

10. The method of claim 9 wherein the values determined in step (f) increase along the length of the filament.

11. The method of claim 9 wherein the values determined in step (f) increase and then decrease along the length of the filament.

12. The method of claim 9 including the additional steps of:
   (h) determining a value for the magnitude of the first component for each of the sequence of longitudinal positions; and
   (i) comparing the values determined in step (h), differences in said values being indicative of changes in the beam of radiation.

13. The method of claim 9 including the additional steps of determining a value for the magnitude of the first component for each of the sequence of longitudinal positions and normalizing the value of the total power determined in step (f) for each position by its corresponding magnitude.

14. The method of claim 1 wherein:
   steps (b) through (e) are performed at a second angular location; and
   the second components identified in step (e) for the two angular locations are compared, said comparison being indicative of the location within the filament's cross-section of the defect at the longitudinal position.

15. The method of claim 1 wherein the spatial frequency spectrum is generated by performing a fast Fourier transform on the detected interference pattern.

16. A method for detecting defects in a transparent filament comprising the steps of:
   (a) directing a beam of radiation at said filament so as to produce an interference pattern;
   (b) detecting said interference pattern for a first longitudinal position along the length of the filament;
   (c) determining a value for the total power of the interference pattern detected in step (b);
   (d) detecting said interference pattern for a second longitudinal position along the length of the filament;
   (e) determining a value for the total power of the interference pattern detected in step (d); and
   (f) comparing the values for the total power determined in steps (c) and (e), differences in said values being indicative of the presence of a defect in the filament.

17. The method of claim 16 including the additional steps of:
(g) generating a spatial frequency spectrum for said interference pattern detected in step (b);
(h) identifying a first component of said spatial frequency spectrum of step (g), said first component corresponding to the outer diameter of the filament;
(i) determining a value for the magnitude of the first component identified in step (h);
(j) generating a spatial frequency spectrum for said interference pattern detected in step (d);
k) identifying a first component of said spatial frequency spectrum of step (j), said first component corresponding to the outer diameter of the filament;
(l) determining a value for the magnitude of the first component identified in step k); and
(m) comparing the values for the magnitude of the first component determined in steps (i) and (l), differences in said values being indicative of changes in the beam of radiation.

18. The method of claim 17 including the additional steps of:
normalizing the value for the total power determined in step (c) by the magnitude of the first component determined in step (i); and
normalizing the value for the total power determined in step (e) by the magnitude of the first component determined in step (l).

19. A method for detecting a defect in a transparent filament comprising the steps of:
(a) directing one or more beams of radiation at a first longitudinal position along the length of said filament so as to produce one or more interference patterns;
(b) detecting said one or more interference patterns at a first angular location;
(c) generating a spatial frequency spectrum for said interference pattern detected at the first angular location;
(d) identifying a first component of said spatial frequency spectrum of step (c), said first component corresponding to the outer diameter of the filament;
(e) identifying a second component of said spatial frequency spectrum of step (c), said second component having a spatial frequency greater than zero and less than the spatial frequency of the first component identified in step (d), the presence of the second component in the spatial frequency spectrum being indicative of the presence of the defect in the filament at the first longitudinal position;
(f) detecting said one or more interference patterns at a second angular location;
(g) generating a spatial frequency spectrum for said interference pattern detected at the second angular location;
(h) identifying a first component of said spatial frequency spectrum of step (g), said first component corresponding to the outer diameter of the filament;
(i) identifying a second component of said spatial frequency spectrum of step (g) said second component having a spatial frequency greater than zero and less than the spatial frequency of the first component identified in step (h), the presence of the second component in the spatial frequency spectrum being indicative of the presence of the defect in the filament at the first position; and
(j) comparing said second component identified in step (e) with said second component identified in step (i), said comparison being indicative of the location within the filament's cross-section of the defect at the first position.

20. The method of claim 19 including the additional steps of determining a value for the total power of the interference pattern detected at the first angular location and comparing said total power with a predetermined threshold.

21. The method of claim 19 including the additional steps of determining a value for the total power of the interference pattern detected at the first angular location, determining a value for the magnitude of the first component identified in step (d), normalizing the total power to the magnitude of the first component, and comparing the normalized total power with a predetermined threshold.

22. The method of claim 19 including the additional steps of:
(k) directing one or more beams of radiation at a second longitudinal position along the length of said filament so as to produce one or more interference patterns;
(l) repeating steps (b) through (j) for said second longitudinal position;
(m) determining values for the total power of the interference pattern detected at the first angular location for the first and second longitudinal positions; and
(n) comparing the values for the total power determined in step (m), differences in said values being indicative of the presence of the defect in the filament.

23. The method of claim 22 including the additional steps of:
(o) determining values for the magnitude of the first component identified in step (d) for the first and second longitudinal positions; and
(p) comparing the values for the magnitude of the first component determined in step (o), differences in said values being indicative of changes in the beam of radiation.

24. The method of claim 23 including the additional step of normalizing the value for the total power determined in step (m) by the magnitude of the first component determined in step (o) for each of the first and second longitudinal positions.

25. A method for detecting defects in a transparent filament comprising the steps of:
(a) directing a beam of radiation at said filament so as to produce an interference pattern;
(b) detecting the total power of a portion of the interference pattern; and
(c) comparing the total power with a predetermined threshold, an exceeding of the threshold being indicative of the presence of a defect in the filament.

26. A method for detecting defects in a transparent filament comprising the steps of:
(a) directing a beam of radiation at said filament so as to produce an interference pattern;
(b) detecting the total power of a portion of the interference pattern;

(c) generating a spatial frequency spectrum for the interference pattern;
(d) identifying a first component of the spatial frequency spectrum, said first component corresponding to the outer diameter of the filament;
(e) determining a value for the magnitude of the first component;

(f) normalizing the total power to the magnitude of the first component; and
(g) comparing the normalized total power with a predetermined threshold, an exceeding of the threshold being indicative of the presence of a defect in the filament.

* * * * *